Aug. 4, 1931. I. E. McCABE 1,817,634
PRESSURE ACTUATED SWITCH OPERATING DEVICE
Filed April 26, 1928    4 Sheets-Sheet 1

INVENTOR.
IRA E. McCABE
BY
ATTORNEYS.

Aug. 4, 1931.                I. E. McCABE                1,817,634
              PRESSURE ACTUATED SWITCH OPERATING DEVICE
                    Filed April 26, 1928      4 Sheets-Sheet 2

INVENTOR.
IRA E McCABE
BY
ATTORNEYS.

Aug. 4, 1931.  I. E. McCABE  1,817,634
PRESSURE ACTUATED SWITCH OPERATING DEVICE
Filed April 26, 1928   4 Sheets-Sheet 3
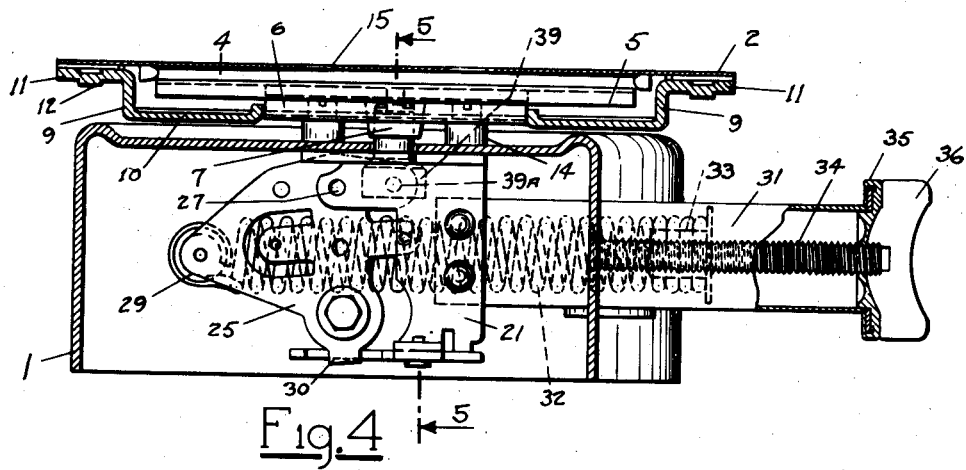
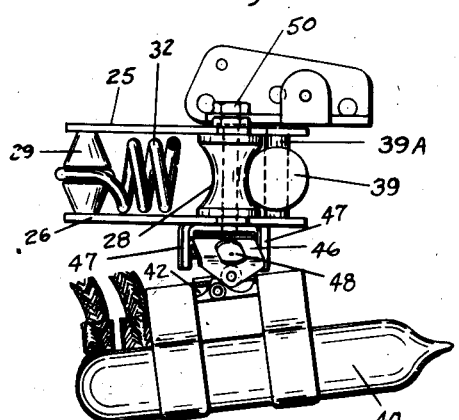
Fig. 6
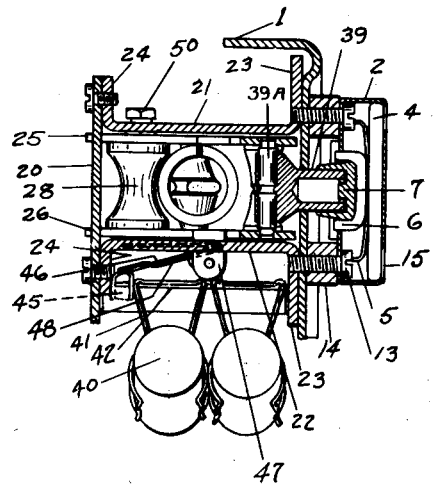
Fig. 5
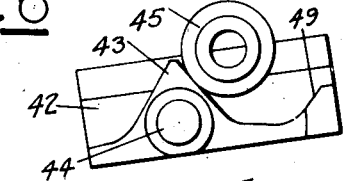
Fig. 7
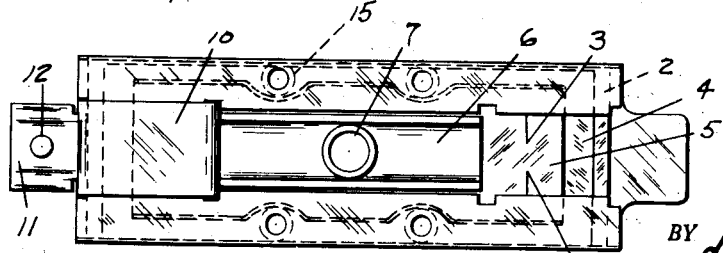
Fig. 14
INVENTOR.
IRA. E. McCABE
BY
ATTORNEYS.

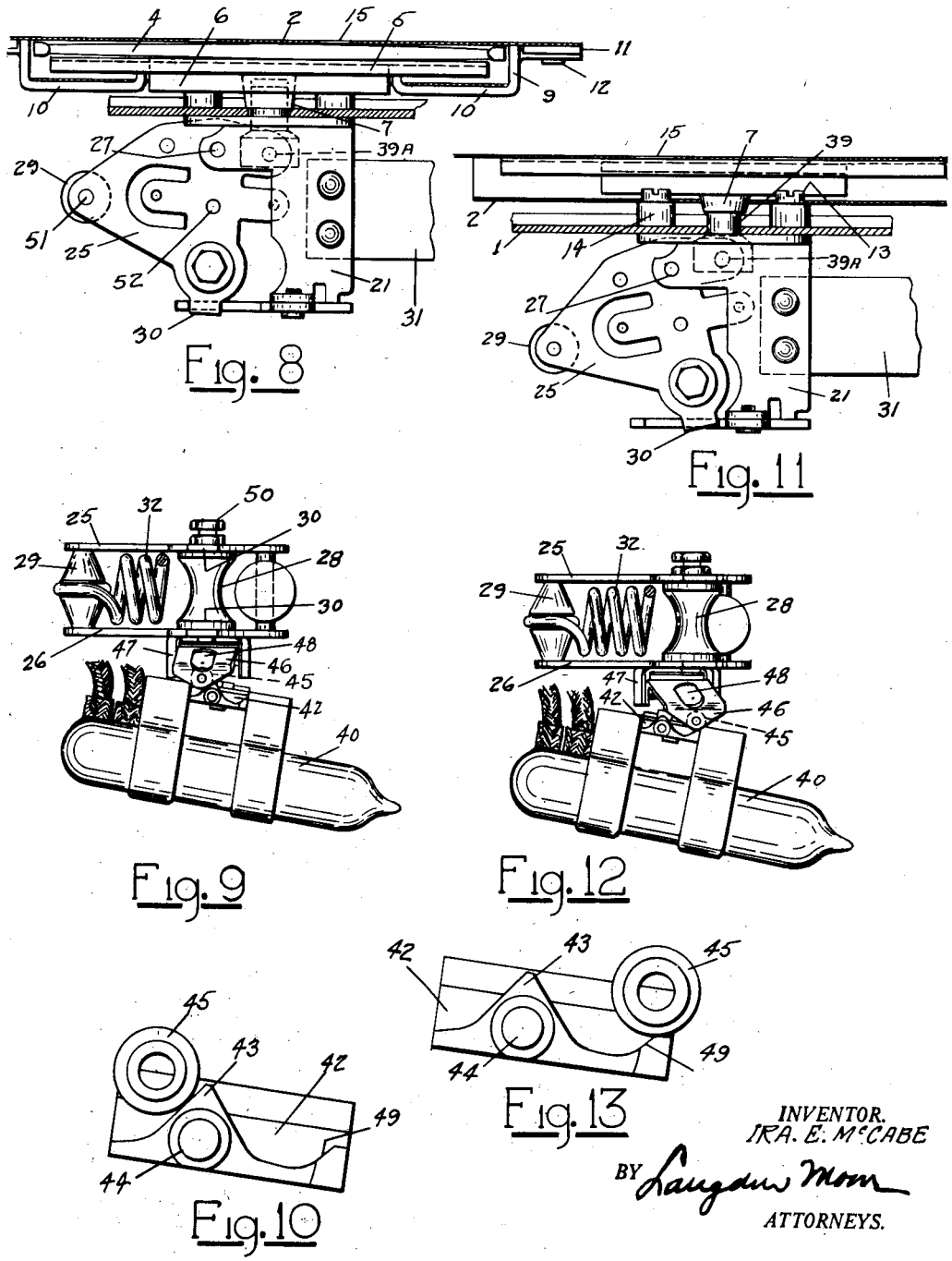

Patented Aug. 4, 1931

1,817,634

UNITED STATES PATENT OFFICE

IRA E. McCABE, OF CHICAGO, ILLINOIS

PRESSURE ACTUATED SWITCH OPERATING DEVICE

Application filed April 26, 1928. Serial No. 272,886.

This invention relates to improvements in pressure actuated mechanism for operating electric switches and more particularly to electric switch operating mechanism provided with an expansible and contractible actuating element whereby changes in the temperature of said element operates the switch and means for attaching said mechanism to a body the temperature of which controls the operation of said switch.

It is an object of this invention to provide in an electric circuit which controls the operation of mechanism for producing changes in temperature, such as electrically operated oil burning or refrigerating machines, a switch which will be actuated by predetermined changes in the temperature produced by said mechanisms to close or break said controlling circuit.

One of the many uses of this invention is its application to control an electrically operated oil burner as installed in connection with a hot water domestic heating system. Devices for this purpose have heretofore been employed having a thermostatic member adapted to be actuated by contact with the water and have necessitated a hole being drilled in the boiler wall for the insertion of the thermostatic member and thereafter the provision of a water tight packing and joint. One of the most obvious advantages of the present invention is that the device may be readily applied to the exterior of the boiler or to the pipe through which the heated water rises from the boiler, to enter the heating system, commonly called the riser, and by the improved attaching means whereby it may be clamped on to the riser, whether it be vertical or horizontal both of which being usual commercial constructions, with the switch operating mechanism in operative position and control the burner circuit in the same manner as if directly in contact with the hot water. It is felt that a description of this particular application will be a sufficient disclosure to others skilled in the art to apply the same to the other uses to which it is adaptable.

In describing this embodiment of this invention reference is made to the accompanying sheets of drawings with the understanding that minor detail changes may be made therefrom without departing from the scope of the invention.

In the drawings:

Figure 4 is a top plan view of Figure 1 in which the switch casing is shown in section as well as the actuating casing.

Figure 5 is a detail view in vertical transverse section taken through the operating and actuating mechanism on the line 55, Figure 4.

Figure 6 is a detail view in front elevation of the operating mechanism with the front plate removed.

Figure 7 is an enlarged detail view in front elevation of a part of the switch operating mechanism.

Figure 8 is a detail fragmentary plan view of the actuating and operating mechanisms, with the casings of each in section, showing the relation of the parts when the temperature has increased sufficiently to actuate the mechanism to throw the switch to break the electrical circuit.

Figure 9 is a detail view in front elevation, with the front plate and casing removed illustrating the relation of the parts when in the position shown in Figure 8.

Figure 10 is an enlarged detail view in front elevation showing the relation of parts of the operating mechanism when in the position shown in Figure 9.

Figures 11, 12 and 13 are views similar to Figures 8, 9 and 10 showing the position assumed by the various parts of the operating mechanism should the actuating mechanism fail or become inoperative by destruction of the power element.

Figure 14 is a plan view of the actuating mechanism casing removed from the operating mechanism casing looking at that part which engages the latter casing, with one end cap removed.

Figure 1:
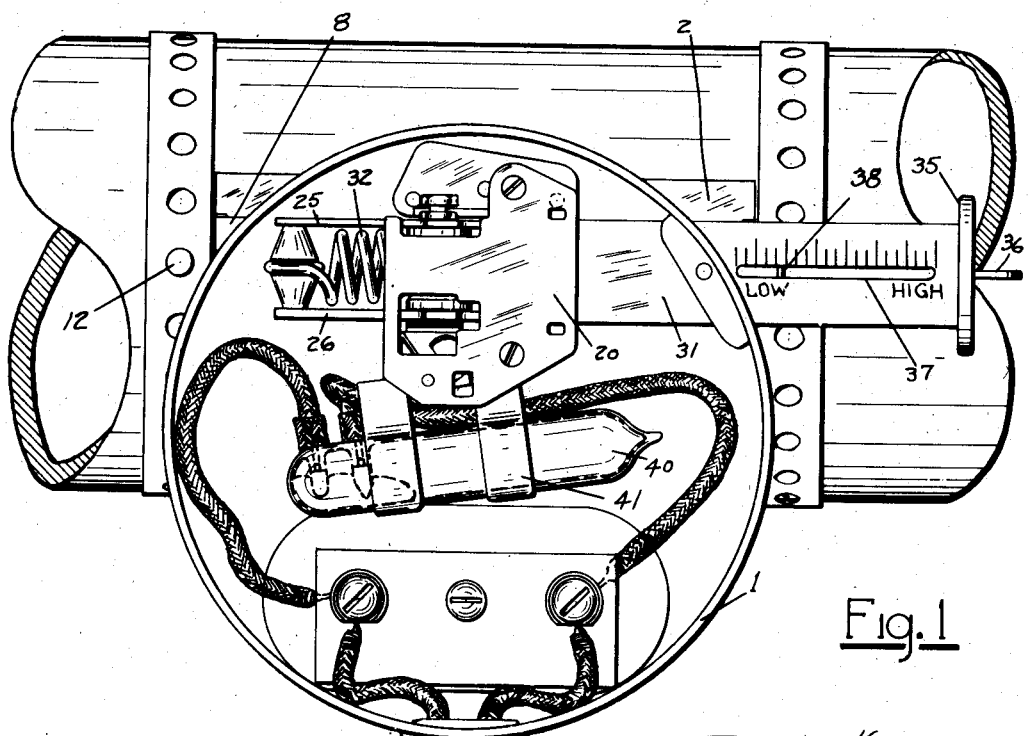
Figure 1 is a view in front elevation of this improved device as attached to a horizontal pipe or riser of a hot water heating system, with the front of the casing removed.
Figure 2:
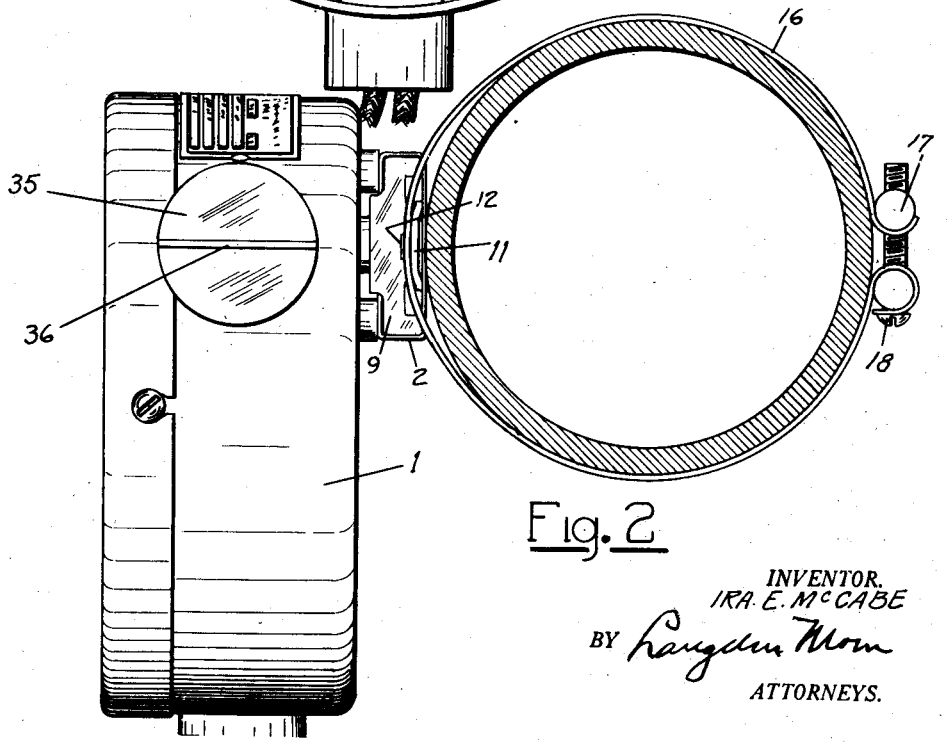
Figure 2 is a view in end elevation of Figure 1.
Figure 3:
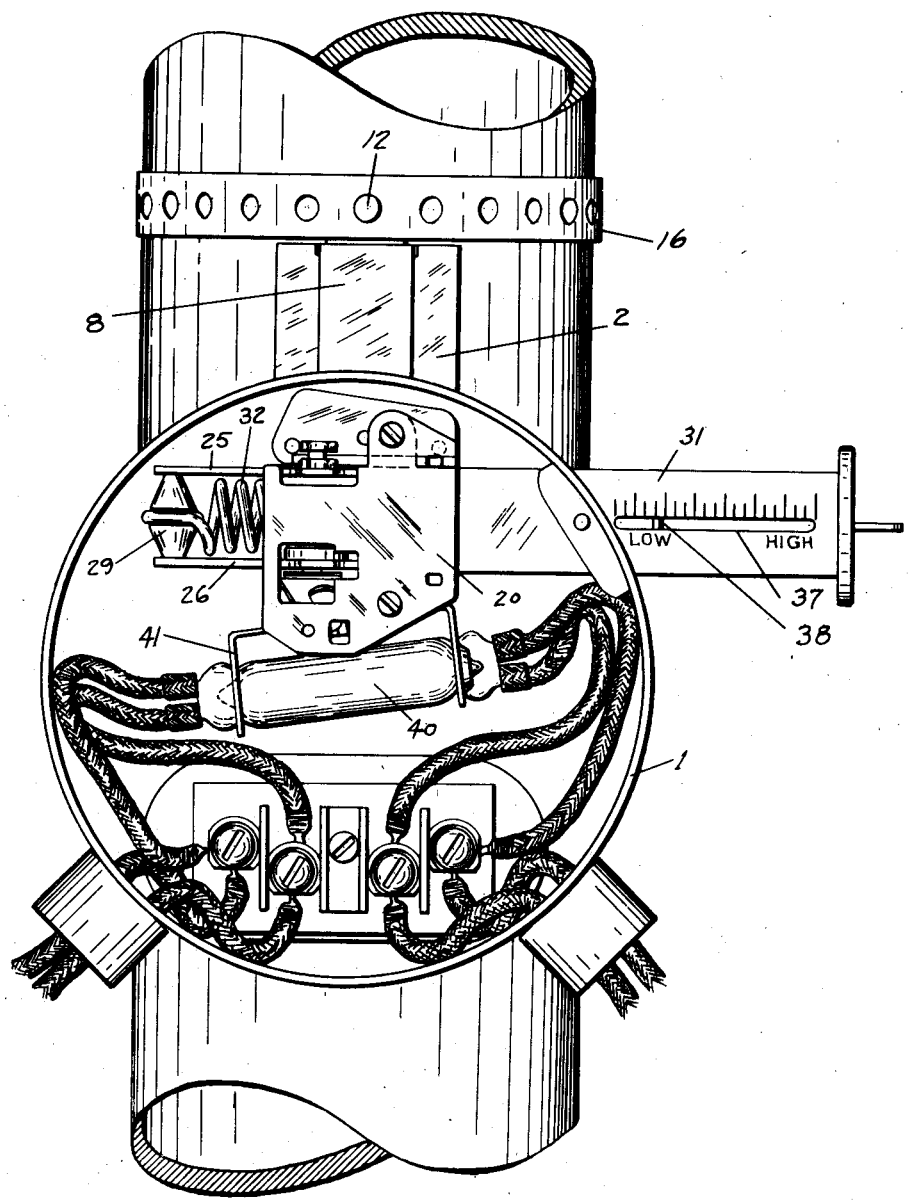
Figure 3 is a view similar to Figure 1 in which the device is attached to a vertical pipe or riser.

As shown in Figures 1, 2 and 3, the switch operating mechanism is enclosed with a cylindrical casing 1 and the actuating device therefor within a flat oblong casing 2. The actuating mechanism casing 2 is preferably formed of thin resilient metal and is rectangular in transverse section, as shown in Figure 5. The side adapted to be secured adjacent the rear wall of the cylindrical switch casing 1 is provided with a longitudinal opening 3, Figure 14, extending throughout its length and the opposite side is provided with an extension at each end approximately the same width as the said longitudinal opening. The actuating or power element comprises an elongated flat thin metallic capsule 4 hermetically sealed and containing a fluid readily responsive to changes in temperature to cause the flat sides to expand and contract, as more fully described in the applicant's copending application Serial No. 228,258 filed Oct. 24, 1927.

One flat side of the capsule 4 rests upon the exterior side of the casing and a follower plate 5 is arranged between the other flat side and slotted side of the casing adjacent the switch casing. This follower plate 5 is of slightly less length and width than the capsule and slides readily within the casing. An elongated guide member 6 is secured centrally upon the follower plate to extend upwardly through the longitudinal opening on that side of the casing provided with longitudinal side walls adapted to maintain sliding contact with the edges of the casing during expansion and contraction of the capsule. A power transmitting sleeve 7 is centrally mounted upon the guide member extending beyond that side of the casing. The guide member 6 is positioned with the sleeve 7 in the center of the casing and over the center of the capsule and the capsule is retained within the casing by caps 8 detachably secured on each open end of the casing. Each cap 8 is provided with a portion 9 adapted to fit within the end walls of the casing and close the same whereby the capsule 4 is retained in position. This closure portion 9 is provided with an extension 10 from one side slightly greater than the opening between the walls of the flat sides of the casing 2 and is formed to engage the flat walls thereof and terminate in a bend in the direction of the opposite flat casing side to form a hook to engage in oppositely disposed notches in the casing walls, and with an extension 11 from the other side of substantially the same shape and adapted to lie over the end extension of the flat extension of casing body, whereby by depressing the exterior end of the extension 11, due to the spring in the casing extension, the hook on the other extension 10 may be engaged or disengaged from the casing body. This extension 11 is provided with a central outwardly extending stud 12, the purpose of which will hereinafter be described. The guide member is of such length as to be engaged by the ends of the portions 10 of the caps 8 to properly position the power transmission sleeve 7.

The power element casing is preferably secured to the switch casing by four screws 13 and held in spaced relation thereto by screw threaded sleeves 14 on each screw arranged between the said casings. It is preferable to arrange these screws 13 equidistant from each other and from the power transmission sleeve 7 and provide openings 15 therefor for their insertion through the flat outer side of the casing 2 with their heads engaged with the interior of the inner walls of the opposite side. To insert the screws 13 apertures 15 are provided in the outer flat side of casing 4 through which the heads of the screws may be passed to engage the inner surface of the opposite flat side of the casing and then through the sleeves 14 to hold the same in engagement with the switch casing so that the actuating casing must be secured to the switch casing before the power element capsule 4 and follower plate 5 are inserted, thereby preventing the disengagement or removal of the actuating casing after the installation of the power element 4.

With the power element attached to the switch casing, the device is preferably secured to the pipe or tank, the temperature will control the operation by placing the flat and longitudinal outer side of the casing 2 against the longitudinal surface of the pipe or tank, passing strips 16 of perforated metal about the pipe or tank with one of the perforations in each strip engaging with the stud 12 upon each end cap 8, and drawing the strips tight against the pipe or tank, as shown in Figure 2, preferably by the employment of two cylindrical members 17, approximately in length the width of the strip, each having a central transverse screw threaded aperture adapted to receive a securing screw 18 whereby the screw passing through one member 17 and through a perforation of the strip may be passed through a perforation in the other end of the strip and engaged with the other member 17 and secured. The screws 18 draw the ends of the strips toward each other and firmly clamp the device in place, the engagement of the studs 12 with the perforations prevent the strips from becoming disengaged as well as the casing from slipping from its original position. Inasmuch as the perforated strip may be of any desired length, the size of the pipe or tank is immaterial. Since the outward extensions 11 of the caps 8 rest upon the casing extension when the hooked ends of the inward extensions 10 engage the notches in the casing walls and since the casing is of resilient metal, to attach or detach the caps 8 the outward extension 11 is depressed against the casing extension and the hooked portion of the cap is readily snapped into or out of engagement with the casing but when the casing is held against a pipe or tank the whole body of the casing is held rigid, so the cap can not become detached after the device has been clamped on the pipe or tank.

Since the switch operating mechanism includes a mercury tube switch to be operative, it is necessary that the switch casing be secured to the pipe or tank with the mercury tube in a certain predetermined relation to the vertical. As shown in Figures 1 and 2, the actuating member casing 2 is arranged to clamp the switch casing 1 upon a horizontal pipe or tank with the mercury tube switch in operating position. Since the actuating casing is secured to the switch casing by four screws equidistant from each other and from a common center, when it is desired to clamp the switch casing upon a vertical pipe or tank, it is only necessary to remove one of the caps 8, withdraw the power element or capsule 4 and follower plate 5, unless said follower plate is recessed about each screw head, to expose the screw heads through the opening 15. The screws may then be detached from the switch casing 1, the actuating casing 2 rotated one quarter turn, the screws again engaged with casing 1, the power element or capsule and follower plate reinserted, the cap snapped into engagement, and the device is ready to be clamped upon a vertical pipe or tank as shown in Figure 3.

The switch operating mechanism comprises a rectangular frame, as shown in transverse section in Figure 5, including a front plate 20 with spaced-apart top and bottom plates 21 and 22, each having formed flanges 23 adapted to rest against the rear wall of the casing 1 and be secured thereto and formed up ears 24 adapted to be secured to the front of plate 20. The operating member of the switch mechanism comprises two spaced-apart triangular plates 25 and 26 held in rigid relation to each other by the pivot pin 27 adjacent one apex having portions extending through and beyond each plate to pivotally engage bearings in the top and bottom plates 21 and 22 respectively, by an oppositely disposed spacing member 28 adjacent another apex, and, adjacent the third apex and thereof intermediate the others, by a spring anchor 29 also engaging both plates 25 and 26, whereby the operating member is mounted to oscillate within the frame. Each plate 25 and 26 is provided with an extension 30 projecting outward from the spacing member 28 between openings provided therefore in the front plate 20 so as to engage the front plate to limit the oscillation of said plates.

Extending from the side of the frame of the oscillating operating member a box like casing 31 is secured to the plates 21 and 22 which passes out through the side of casing 1 to house a coil spring 32 secured at one end to the spring anchor 29 and at the other end to a screw threaded block 33 mounted to travel longitudinally within the box casing 31 upon a screw threaded shaft 34 having a circular cap 35 adapted for rotation about the outer end of the box casing 31 and having a diametrical fin 36 projecting outwardly therefrom for manually adjusting the tension of the spring. It is preferable to provide a slot 37 on the front of the box casing which extends beyond the switch casing, through which an indicating pointer 38 upon the block 33 is visible and to graduate the edge of the slot to indicate the spring tension. An additional location 52 for spring anchor 29 is provided which may be used. The proper position to secure a uniform differential in connection with expansive liquids usually used is at 51 Fig. 8. When at 52 the differential in pounds is uniform or nearly so, but the temperature differential will decrease as the temperature rises.

The spring anchor 29 being to one side of the pivot 27 of the operating member, the spring 32 normally exerts a pull to rotate the member in that direction. A power transmission stud 39, adapted to be received within and be engaged by the power transmission sleeve 7 of the actuating mechanism is mounted upon a pivot 39—A mounted in bearings provided therefor in the operating member plates 25 and 26 upon the side of the plate pivot 27 most distant from the spring anchor 29, which stud 39 passes through an opening in the rear wall of the switch casing 1, so that upon expansion of the power element capsule movement will be transmitted through the sleeve 7 and stud 39 to cause the operating member to be rotated about its pivot 27 against the tension of the spring 32.

The switch 40, adapted to be operated by the operating mechanism, is of the type commercially known as a mercury tube switch and may be of any approved style of mercury switch in which the terminals of the circuit to be controlled are arranged in spaced-apart relation with a sealed tube containing a quantity of mercury so that when the tube is tilted with one end lower than the other the mercury will flow into that end and close the contact between the terminals and close the circuit and when tilted in the opposite direction the mercury will flow into the opposite end, away from the terminals, and break the circuit. As shown in Figures 1 and 3, the mercury tube switch 40 is supported in clamps 41 and Figures 5, 6, 9 and 12 show the clamps 41 depending from a switch supporting plate 42, which is shown in Figure 5 as being pivotally mounted in bearings provided in the front plate 20 and dependent flange 23 of the bottom plate 22. In order to tilt the switch plate 42 about its pivot 44 to operate the switch to make and break the circuit, a portion of the switch plate, preferably the outer end, is provided with an irregular track having an upward triangular projection 43 the apex of which is in a line passing through the center of the pivot member 44 of the plate 42 and perpendicular to the plate, with equally sloping side which curve with the bottom of the track. A roller 45 is arranged to travel over the track, which roller is mounted at the free end of a spring pressed member 46 pivoted between ears 47 formed down from the lower plate 26 of the operating frame whereby rotation of the operating member about its pivot 27 causes the roller 45 to travel over the track on the end of the pivoted switch supporting plate 42. A spring 48 Figure 5, is shown with one end engaging the member 46 passing beyond the pivot thereof and then bent back upon itself to engage the under side of the plate 26. The tension of this spring 48 is adjusted by means of a screw 50 which passes through the center of the spacing member 28 and through plate 26 to engage the portion of the spring 48 which bears upon the underside of said plate. The relation of the roller 45 and the triangular projection 43 of this track is so arranged that when the entire device is clamped on a pipe or tank in operative position and the temperature thereof has increased to or above the predetermined or desired degree said increase in temperature will have caused the power element or capsule 4 to expand, which movement will be imparted through the power transmission sleeve 7 and stud 39 to cause the operating member 25 to rotate against the tension of the spring 32 to the position shown in Figure 8 and when in this position the roller 45 will engage one sloping side of the projection 43 of the track as shown in Figures 9 and 10 and tilt the switch carrying plate 42, as shown about its pivot 44 to tilt the mercury tube switch to open position. When the temperature within the pipe or tank decreases below that predetermined or desired, the capsule 4 contracts and the tension spring 32 causes the operating member to rotate about its pivot 27 in the opposite direction and through the spring pressed member 46 causes the roller 45 to travel over the apex of the projection 43 and engage the opposite sloping side thereof, as shown in Figures 6 and 7, whereby the mercury tube switch is tilted to closed position. As the capsule 4 or power element, acted upon by the changes in temperature of the pipe or tank, expands and contracts in response to the fluctuation of said temperature, the mercury tube switch will be tilted back and forth to open and close the circuit it controls. Should the capsule become defective or punctured so that it collapses it will contract more than normal movement to the operating member, whereby a greater than normal movement will be imparted to the roller 45 away from the track projection 43. As a safeguard to insure the breaking of the circuit, should such a failure of the actuating element occur, an additional projection 49 is provided upon the track with an angular projection parallel to the "off" position angular side of projection 43 which the roller will engage and tilt the switch to the open position as shown in Figures 12 and 13. The roller and switch will assume this "off" position whenever the capsule 4 is removed from its casing, such as when it is desired to change the actuating casing relative to the switch casing.

The extra travel of the mechanism to off position as shown in Figures 11, 12 and 13 may be left off if desired, by proper location of the stops on front plate 20, so as to permit of but two position operation.

At times it is desirable to control two circuits and in such a case two mercury tubes are adapted to be supported in an additional set of clamps supported upon the plate 42, as shown in Figure 5. Figure 3 illustrates two circuits, each connected to a mercury tube switch, in which one circuit is broken when the other is closed.

What I claim is:—

1. A pressure actuated switch operating device, comprising an actuating mechanism including a temperature responsive expansible and contractible element contained within a casing and a switch operating mechanism contained within a separate casing, means for attaching the two casings to each other and forming a transmission connection between the actuating and operating mechanisms, and means for clamping the actuating casing upon a fluid container including means preventing the removal of the expansible and contractible element when the device is in clamped position.

2. A pressure actuated switch operating device, comprising an actuating mechanism including a temperature responsive expansible and contractible element contained within a casing and a switch operating mechanism contained within a separate casing, means for attaching the two casings to each other and forming a transmission connection between the actuating and operating mechanisms, and means for clamping the actuating mechanism upon a fluid container including a detachable closure for the actuating mechanism casing adapted to be engaged by said clamping means and prevent the removal of the expansible and contractable element.

3. A pressure actuated switch operating device, comprising a temperature responsive expansible and contractible capsule, a casing therefor, detachable closures for the casing, a switch operating mechanism contained within a separate casing, means for attaching the two casings to each other and forming a transmission connection between said capsule and said operating mechanism, and means for clamping the capsule casing upon a fluid container and preventing detachment of said closures from the casing when the device is in clamped position.

4. A pressure actuated switch operating device, comprising a temperature responsive expansible and contractible flat capsule, a casing therefor snugly receiving said capsule, a switch operating mechanism contained in a separate casing, means for attaching the empty actuating casing to the operating casing, a power transmission connection carried in the actuating casing, the insertion of the flat capsule in the empty casing after being attached to the other casing, acting to bring the power transmission connection in contact with the switch operating mechanism and render the attaching means secured against detachment.

5. A pressure actuated switch operating device, comprising a temperature responsive expansible and contractible capsule, means to transmit the movement of the capsule in expanding and contracting to a switch operating member, means connecting said operating member to a switch to throw the switch to open position when the capsule expands beyond a predetermined degree, a spring acting upon the operating member to actuate the operating member to throw the switch to closed position when the capsule contracts to said predetermined degree, and means upon abnormal contraction of the capsule to actuate the operating member to throw the switch to open position.

6. A pressure actuated switch operating device comprising a temperature responsive pressure actuated member, a switch operating mechanism and means to transmit movement from the pressure member to the operating mechanism, said switch operating mechanism including a spring actuated pivoted operating member normally in engagement with the movement transmitting means, a pivoted switch carrying member mounted to rotate at right angles to the operating member, and means actuated by rotative movement of the operating member to rotate the switch carrying member to operate the switch.

7. A pressure actuated switch operating device comprising a temperature responsive pressure actuated member, a switch operating mechanism and means to transmit movement from the pressure member to the operating mechanism, said switch operating mechanism including a pivoted operating member, a spring normally holding the operating member in engagement with the movement transmitting means, a switch carrying member, a pivot therefor mounted at right angles to the pivot of the operating member, means upon the switch carrying member co-operating with means carried upon the operating member to operate the switch upon variation of pressure of the pressure actuated member.

8. A pressure actuated switch operating device comprising a temperature responsive pressure actuated member, a switch operating mechanism and means to transmit movement from the pressure member to the operating mechanism, said switch operating mechanism including a pivoted operating member, a spring normally holding the operating member in engagement with the transmitting means, means for adjusting the tension of the spring, a mercury tube switch, a pivoted switch carrying member, mounted to rotate at right angles to the operating member, means upon the switch carrying member co-operating with a spring pressed member carried upon the operating member to snap the mercury tube to open and closed position upon transmission of movement from the pressure actuated member.

9. A pressure actuated switch operating device comprising a temperature responsive pressure actuated member, a switch operating mechanism and means to transmit movement from the pressure member to the operating mechanism, said switch operating mechanism including a pivoted spring actuated operating member normally in engagement with the transmitting means, a pivoted switch carrying member, a mercury tube switch carried thereby, a spring pressed roller mounted on the operating member, an irregular track mounted upon the switch carrying member over which the roller is adapted to travel with the irregularities so formed that movement of the roller in one direction rotates the carrying member in one direction and thereafter movement in the opposite direction imparts a rotation in the opposite direction.

10. A pressure actuated switch operating device comprising a temperature responsive pressure actuated member, a switch operating mechanism and means to transmit movement from the pressure member to the operating mechanism, said switch operating mechanism including a pivoted spring actuated operating member normally in engagement with the transmitting means, a pivoted switch carrying member, a mercury tube switch carried thereby, a spring pressed roller mounted on the operating member, an irregular track mounted upon the switch carrying member over which the roller is adapted to travel with the irregularities so formed that movement of the roller in one direction rotates the carrying member in one direction and thereafter movement in the opposite direction imparts a rotation in the opposite direction, and continued movement in that direction returns the switch carrying member to the first position.

IRA E. McCABE.